(12) United States Patent
Stoelben et al.

(10) Patent No.: US 9,902,099 B2
(45) Date of Patent: Feb. 27, 2018

(54) MOULDING MACHINES

(71) Applicant: Obrist Closures Switzerland GmbH, Reinach (CH)

(72) Inventors: Peter Stoelben, Briedel Mosel (DE); Patrick Schmidt, Zell-Kairnt (DE)

(73) Assignee: Obrist Closures Switzerland GmbH, Reinach (CH)

( * ) Notice: Subject to any disclaimer, the term of this patent is extended or adjusted under 35 U.S.C. 154(b) by 277 days.

(21) Appl. No.: 14/439,841

(22) PCT Filed: Oct. 31, 2013

(86) PCT No.: PCT/EP2013/072832
§ 371 (c)(1),
(2) Date: Apr. 30, 2015

(87) PCT Pub. No.: WO2014/068069
PCT Pub. Date: May 8, 2014

(65) Prior Publication Data
US 2015/0314502 A1    Nov. 5, 2015

(30) Foreign Application Priority Data

Oct. 31, 2012   (GB) .................................. 1219613.5

(51) Int. Cl.
*B29C 45/16*     (2006.01)
*B29C 45/42*     (2006.01)
(Continued)

(52) U.S. Cl.
CPC .......... *B29C 45/006* (2013.01); *B29C 45/162* (2013.01); *B29C 45/42* (2013.01); *B29L 2031/565* (2013.01)

(58) Field of Classification Search
CPC ...... B29C 45/006; B29C 45/162; B29C 45/42
See application file for complete search history.

(56) References Cited

U.S. PATENT DOCUMENTS 3,363,039 A * 1/1968 Nagai ..................... B29C 45/16
                                                                    249/156
3,435,483 A * 4/1969 Flannery ............... B29C 45/162
                                                                    425/130
(Continued)

FOREIGN PATENT DOCUMENTS

CH          701045 A2    11/2010
CN          1228731 A     9/1999
(Continued)

OTHER PUBLICATIONS

State Intellectual Property Office of the People's Republic of China, First Office Action Issued in Chinese Patent Application No. 201380064180.3, dated Mar. 9, 2016, 13 pages.
(Continued)

*Primary Examiner* — Robert B Davis
(74) *Attorney, Agent, or Firm* — McCoy Russell LLP

(57) ABSTRACT

A moulding machine suitable for producing an article having two or more parts, the moulding machine comprising two or more mould sections for respective article parts and an in-mould pick and place mean. A moulding machine including one or more moulds and a robot pick-and-place system, in which the robot pick-and-place system is fixed to a mould. A method of forming an article having two or more parts, in which a first part of the article is moulded in a first mould section of a moulding machine comprising two or more mould sections for respective article parts and an in-mould pick and place means, and the in-mould pick and place means moves a moulded first part of the article from the first mould section to a second mould section of the two or more mould sections.

15 Claims, 16 Drawing Sheets

(51) Int. Cl.
*B29C 45/00* (2006.01)
*B29L 31/56* (2006.01)

(56) References Cited

U.S. PATENT DOCUMENTS

| | | | | |
|---|---|---|---|---|
| 4,202,522 | A * | 5/1980 | Hanas | B29C 45/2673 249/102 |
| 4,368,018 | A * | 1/1983 | Rees | B29C 45/14008 425/138 |
| 4,519,761 | A * | 5/1985 | Kenmochi | B29C 45/006 29/703 |
| 5,723,085 | A | 3/1998 | Abrams et al. | |
| RE37,676 | E * | 4/2002 | Abrams | B29C 45/006 264/238 |
| 7,387,506 | B2 * | 6/2008 | Nagano | B29C 45/062 425/190 |
| 7,458,801 | B1 | 12/2008 | Brown et al. | |
| 8,827,678 | B2 * | 9/2014 | Moulin | B29C 45/006 425/161 |
| 2004/0124558 | A1 | 7/2004 | Gram | |
| 2011/0293769 | A1 | 12/2011 | Moulin | |

FOREIGN PATENT DOCUMENTS

| | | |
|---|---|---|
| CN | 102015473 A | 4/2011 |
| CN | 102245364 A | 11/2011 |
| DE | 2414741 A1 | 10/1975 |
| DE | 4300065 A1 | 7/1993 |
| EP | 0398044 A1 | 11/1990 |
| EP | 0568732 A1 | 11/1993 |
| EP | 0688655 A2 | 12/1995 |
| EP | 1386712 A1 | 2/2004 |
| FR | 2848496 A1 | 6/2004 |
| JP | H04296520 A | 10/1992 |
| JP | 2000238090 A | 9/2000 |
| WO | 2005005128 A1 | 1/2005 |
| WO | 2005087592 A1 | 9/2005 |

OTHER PUBLICATIONS

Herbst, R. et al., "Die Dreifache Kombination Mehrkomponenten-Spritzgiessen Von Thermoplasten Elastomeren Und Duroplasten," Kunstoffe, vol. 90, No. 10, Oct. 2000, 3 pages. (See NPL 2, ISR/WO Issued in Application No. PCT/EP2013/072832 for Explanation of Relevance).

ISA European Patent Office, International Search Report and Written Opinion Issued in Application No. PCT/ EP2013/072832, dated Mar. 3, 2014, WIPO, 14 pages.

Intellectual Property Office of Great Britain, Search Report Issued in Application No. GB1319613.5, dated Feb. 28, 2013, South Wales, United Kingdom, 5 pages.

Intellectual Property Office of Great Britain, Search Report Issued in Application No. GB1319613.5, dated Nov. 14, 2013, South Wales, United Kingdom, 3 pages.

European Patent Office, Office Action Issued in Application No. 13791763.9, Aug. 5, 2016, Germany, 6 pages.

\* cited by examiner

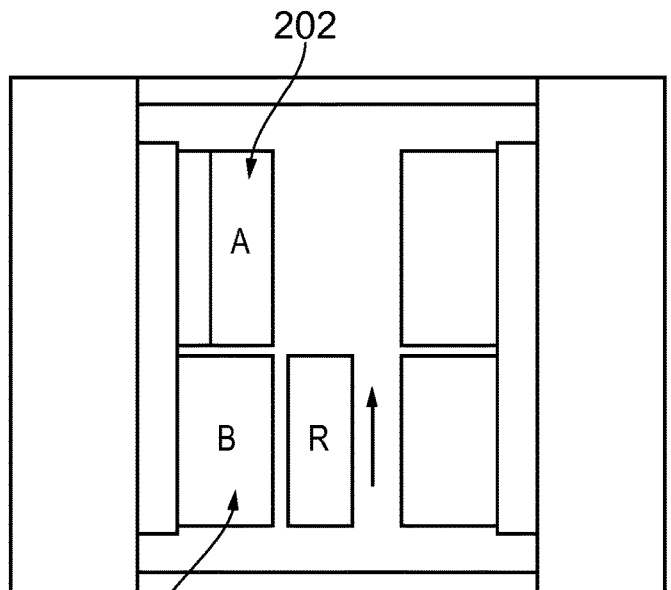
FIG. 7E
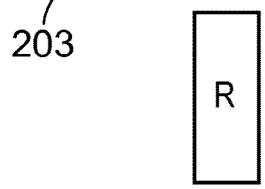
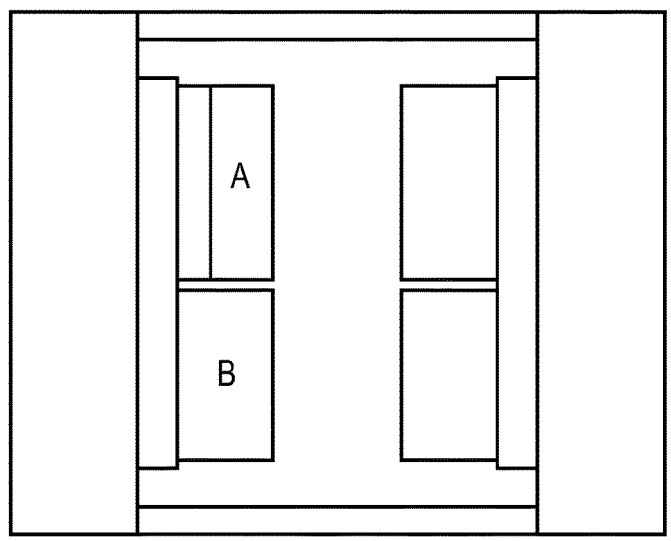
FIG. 7F
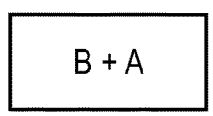

MOULDING MACHINES

FIELD OF THE INVENTION

The present invention relates generally to a moulding machine and particularly, although not exclusively, to an injection moulding machine for multi-component articles such as plastics closures.

BACKGROUND OF THE INVENTION

Injection moulding machines, sometimes referred to as an injection press, are used for manufacturing plastics products by an injection moulding process. This process entails injecting hot liquid plastics material into a mould and letting it cool to form something.

Injection moulding machines are made up of two essential parts: i) the unit that injects the plastic into the mould; and ii) the unit that secures whatever mould is desired to be used to the machine; this is a clamping unit.

The present invention seeks to provide improvements in or relating to moulding machines.

SUMMARY OF THE INVENTION

According to a first aspect of the present invention there is provided a moulding machine suitable for producing an article having two or more parts, the moulding machine comprising two or more mould sections for respective article parts and including an in-mould pick and place means.

In an embodiment, the moulding machine is suitable for producing a plastics closure having two or more assemblable parts.

According to a second aspect of the present invention there is provided a method of forming an article having two or more parts, in which: a first part of said article is moulded in a first mould section of a moulding machine comprising two or more mould sections for respective article parts and an in-mould pick and place means, and said in-mould pick and place means moves a moulded first part of said article from said first mould section to a second mould section of the two or more mould sections.

First and second parts of the article may be moulded in respective first and second mould sections of said moulding machine during the same moulding operation, and the in-mould pick and place means may move a moulded first part of the article from the first mould section to the second mould section for assembly with a moulded second part of the article.

A first part of the article may be moulded in a first mould section of the moulding machine, the in-mould pick and place means moves a moulded first part of the article from the first mould section into a second mould section of the two or more mould sections, and the moulded first part of the article is over-moulded in the second mould section.

According to a third aspect of the present invention there is provided a moulding machine including one or more moulds and a robot pick-and-place system, in which the robot pick-and-place system is fixed to a mould.

The mould sections may be carried on a mould frame.

The mould sections may be provided on the same mould plate.

At least some of the mould sections in a machine may be oriented generally horizontally in use. Alternatively or additionally, at least some of the mould sections may be orientated generally vertically in use.

The mould sections may be suitable for forming the same number of article parts.

In some embodiments a system has first parts of a closure at the top and second parts of a closure below.

The pick and place means may operate at least partly from above and/or from beneath and/or laterally of the mould sections and may move across the mould sections, for example up and down and/or side to side.

The present invention may therefore, in some embodiments, relate to an in-mould pick and place process.

In aspects and embodiments involving assembly of parts, the assembly may be conducted in-mould. Alternatively parts may be ejected from the moulds and assembled out-of-mould.

The present invention may also be concerned with using two combined moulds in a bi-injection press which is linked with a robot pick and place system.

The moulds may be mounted on an adaptation plate which may allow conversion from a pick and place mould into a single face mould. The adaption plate may be used to provide a common parting line between moulds/mould sections which form different size parts.

For example a 24+24 pick and place mould could be converted in a 48 impression single face mould.

The parts produced may be the same, generally the same, or different to each other.

Moulds may be fastened to the injection moulding machine in a horizontal or vertical orientation.

Moulds may be bolted manually to platens on the machine, but where a fast mould change is necessary, magnetic or hydraulic clamps may be used.

The machine may operate with, for example a 1K or 2K process. For example, 2K or 'two-shot' injection moulding consists of processing two different polymers (or two different colours of one polymer) into an end product by means of one injection moulding process. This technology enables several functions to be integrated into an injection moulded product.

The process may include an inspection step, for example using a camera system.

The machine may be: hydraulic (uses a fluid based piston system to operate); mechanical (uses its own weight built during the injection process to keep platens (clamps) held together); electric; or a hybrid (uses a combination of hydraulic and electrical).

The robot may be fixed on the mould (rather than on the machine or elsewhere).

The two parts of a closure may be made in same parting line with e.g. part A on a top half and part B on a bottom half.

Moulding systems according to the present invention may include the steps a) mould b) robot fixed to the mould c) such that the projected area ratio of the two components is less than X, such that the mould is balanced and suffers less wear/lasts longer.

The method and apparatus may include an in-mould assembly step that includes using the ejection stroke to assemble at least part of a product.

Moulding systems according to the present invention may include the steps a) mould b) robot fixed to the mould c) such that the ejection stroke of the mould is an integral part of the assembly step, thus reducing the movement of the robot arm, improving precision and/or allowing greater force.

The assembly stroke may be adjustable in each cavity.

In some aspects and embodiments the invention may be provided as two combined moulds in a bi-injection press which are linked by a pick and place system (such as a robot pick and place system).

In other aspects and embodiments the invention may be provided as an in-mould pick and place moulding system.

In a further aspect of the present invention there is provided a moulding machine including one or more moulds and a robot pick-and-place system, in which the system is fixed to the mould.

Fixing the robot directly to the mould rather than, for example, to the machine is an important feature of some aspects and embodiments of the present invention.

The robot system may, for example, be involved in moving one part of an article relative to another (e.g. closing a closure lid onto a base) or removing articles from a mould.

Advantages of aspects and embodiments of the present invention may include:

No compromise needed in terms of de-moulding functions

Easy to replicate

No need for "special" machines/turntables etc.

Easy to convert format to make non-assembled parts/one or other part as a larger mould Possible to "recycle" robot once mould is no longer used Fast to change mould sides Easier and possibly lighter than other IMA solutions Not as restricted in design as other IMA solutions Can be designed such that parts could be assembled off line also Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

BRIEF DESCRIPTION OF THE DRAWINGS

The present invention will now be more particularly described, with reference to the accompanying drawings, in which:

FIGS. 7A-7F show steps in a method of forming an article having two or more parts;

DESCRIPTION

Figure 1:
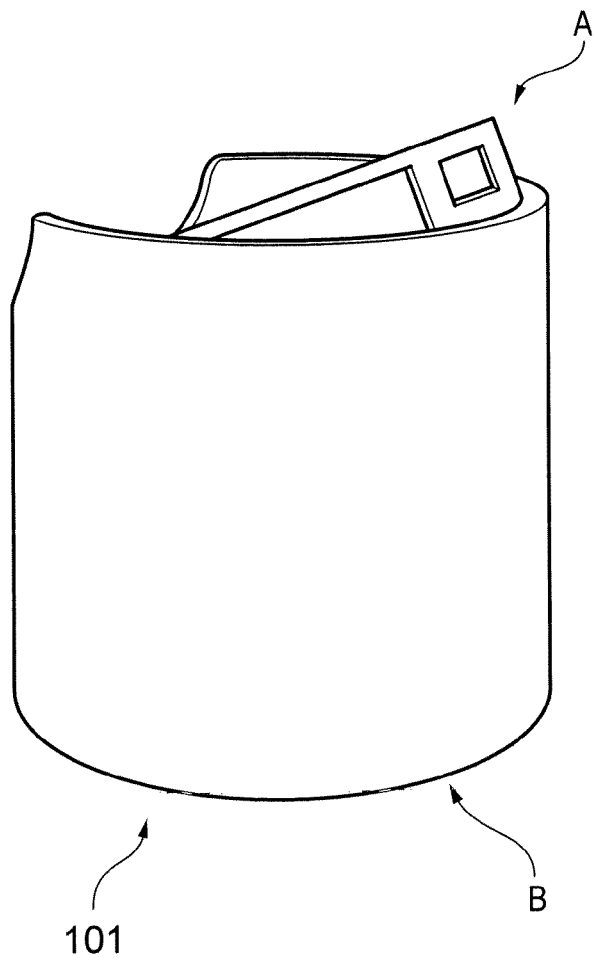
FIG. 1 is a perspective view of a two-part closure with a lid made in a first mould and a body made in a second mould.

An article 101 is shown in FIG. 1. The article takes the form of a two-part plastics closure comprising a lid A and a body B. The lid A is formed in a first mould, the body B is formed in a second mould and the lid A is assembled with the body B to form the assembled closure 101.

Figure 2:
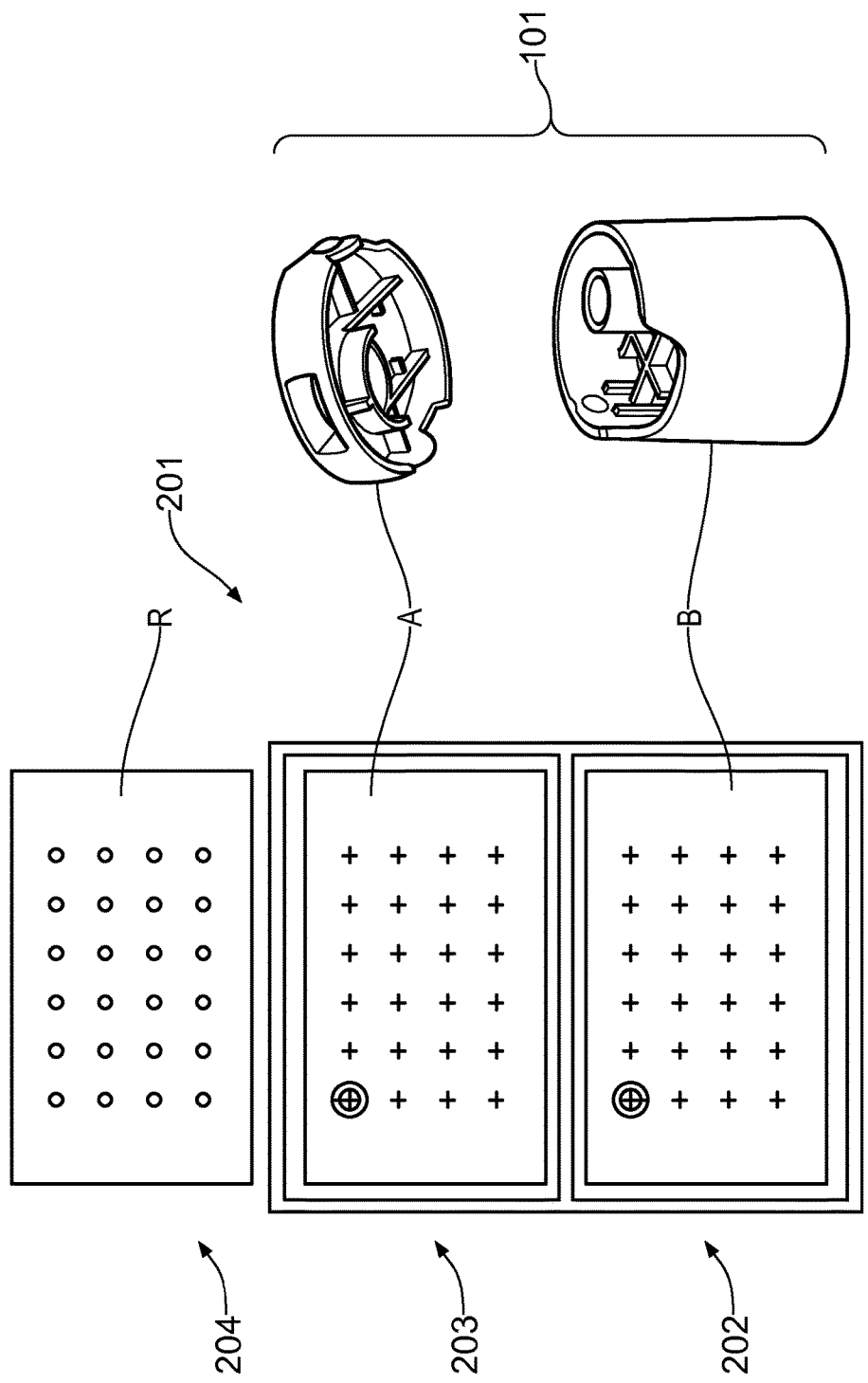
FIG. 2 is a cross-section of a first layout.

FIG. 2 shows a first layout 201 of a moulding machine suitable for producing an article having two or more parts, the moulding machine comprising two or more mould sections for respective article parts and an in-mould pick and place means. The moulding machine comprises a first mould section 202, a second mould section 203 and a pick and place means 204.

In this example, the first layout 201 is suitable for producing the two-part plastics closure 101 of FIG. 1. The first mould section 202 is for forming lid A of the closure 101 and the second mould section 203 is for forming body B of the closure 101. The first and second mould sections 202, 203 may be used to form the same number of article parts. In this illustrated example, the first mould section 202 can be used to form a maximum of 24 parts (lids A) and the second mould section 203 can be used to form a maximum of 24 parts (bodies B). It is to be appreciated that the mould sections may be arranged to form only a single part or any plurality of parts. The pick and place means 204 comprises pick-and-place robot R. In this example, the pick-and-place robot R is capable of handling the same maximum number of article parts that can be formed with each of the first and second moulds 202, 203.

Figure 3:
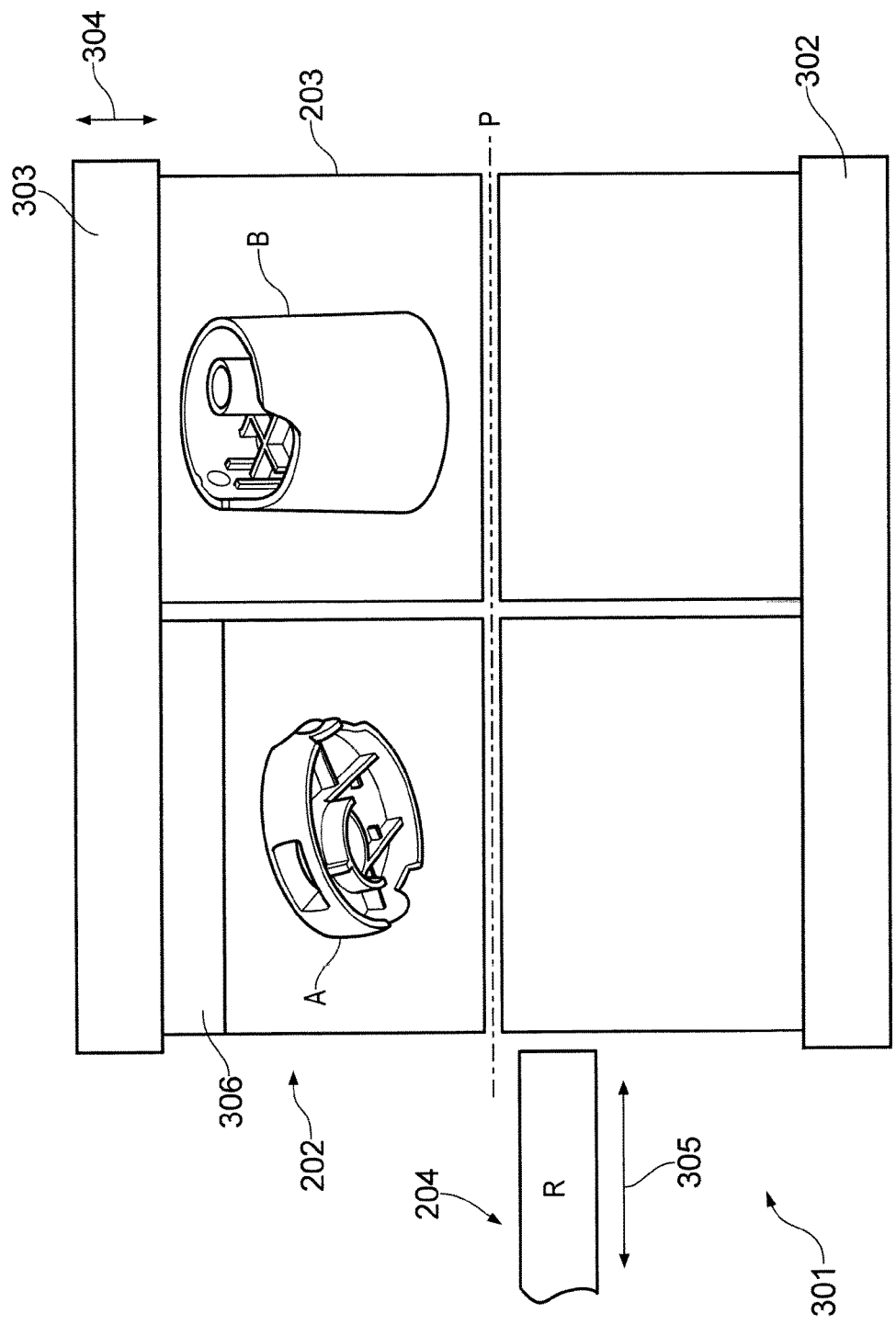
FIG. 3 is a parting line view of the layout of FIG. 2.

A parting line view 301 of the first layout of FIG. 2 is shown in FIG. 3. The moulding machine comprises a fixed platen 302 and a moving platen 303, which is arranged to travel in a direction indicated by arrow 304 towards and away from the fixed platen 302. The parting line is shown at P. The robot R of the pick and place means is configured to travel in a direction indicated by arrow 305, back and forth along a path substantially parallel to the parting line P.

The first mould section 202, for forming lid A, and the second mould section 203, for forming body B, are adjacent one another. The first and second mould sections 202, 203 may be oriented horizontally or vertically. The mould sections may be carried on a mould frame. The mould sections may be provided on the same mould plate. The pick and place means may operate at least partly from above the mould sections, below the mould sections and/or laterally of the mould sections.

In this example, the depth of the first mould section 202 is less than the depth of the second mould section 203. The moulding machine comprises an adaptation plate 306 suitable for use in providing a common parting line between mould sections for article parts that are differently sized. In the parting line view 301, the adaptation plate 306 is located between the moving platen 303 and the first mould section 202.

Figure 4:
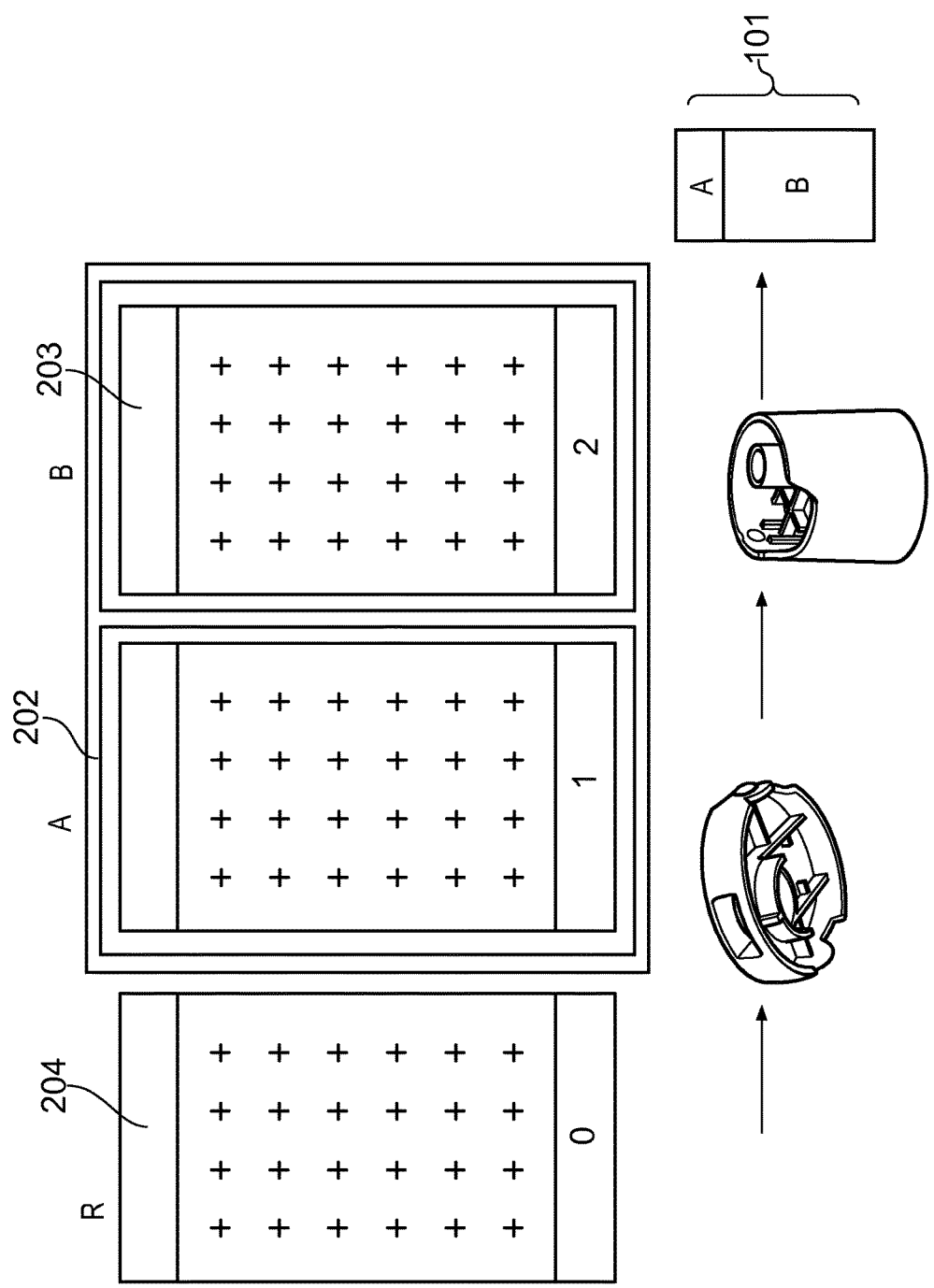
FIG. 4 is a front elevation of an in-mould pick and place 24+24 impression mould prior to conversion.

FIG. 4 shows an in-mould pick and place 24+24 impression mould for use in forming closure 101. The in-mould pick and place 24+24 impression mould comprises a first mould section 202 for forming 24 lids A of closure 101, a second mould section 203 for forming 24 bodies B of closure 101, and an in-mould pick and place means 204 comprising robot R. In position 0 of the in-mould pick and place means robot R, the robot R does not overlap either of the first or second mould sections 202, 203, being away from the mould sections 202, 203 so as not to interfere with use of the moulding sections for forming moulded articles. In position 1 of the in-mould pick and place means robot R, the robot R overlaps the first mould section 202 in an aligned arrangement. In position 2 of the in-mould pick and place means robot R, the robot R overlaps the second mould section 203 in an aligned arrangement.

The arrangement of the—mould pick and place 24+24 impression mould shown in FIG. 4 is suitable for use in a method of forming an article having two or more parts, in which a first part of the article is moulded in a first mould section of a moulding machine comprising two or more mould sections for respective article parts and an in-mould pick and place means, and the in-mould pick and place means moves a moulded first part of the article from the first mould section to a second mould section of the two or more mould sections. The arrangement of the—mould pick and place 24+24 impression mould shown in FIG. 4 is also suitable for use in a method of forming an article having two or more parts, in which first and second parts of the article are moulded in respective first and second mould sections of the moulding machine during the same moulding operation, and the in-mould pick and place means moves a moulded first part of the article from the first mould section to the second mould section for assembly with a moulded second part of the article.

Figure 5:
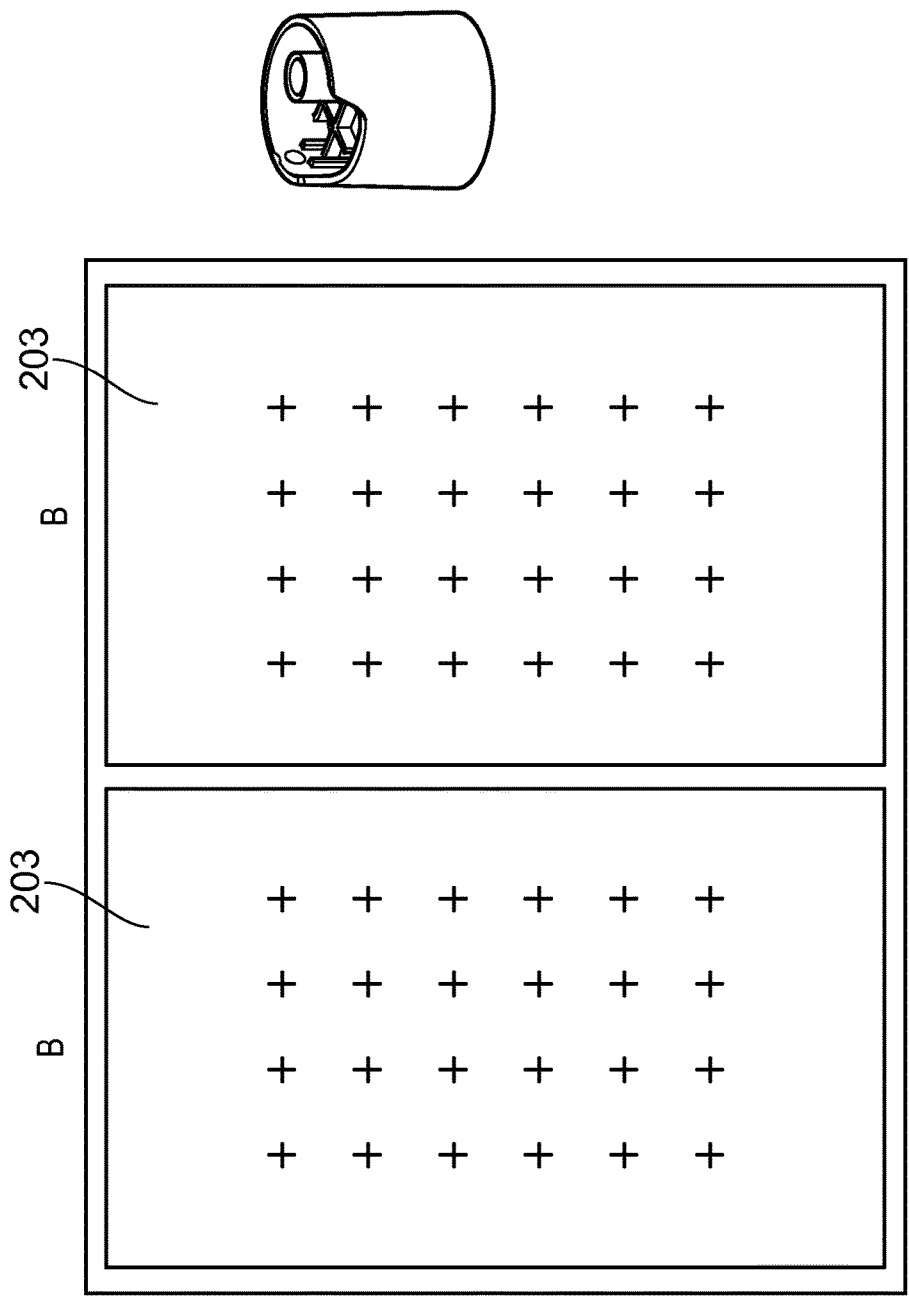
FIG. 5 is a front elevation of the mould of FIG. 4 shown following conversion to a 48 impression single face mould.

FIG. 5 shows the in-mould pick and place 24+24 impression mould of FIG. 4 following conversion to a 48 impression single face mould. In this example, instead of comprising a first mould section 202 for forming 24 lids A of closure 101 and a second mould section 203 for forming 24 bodies B of closure 101, the 48 impression single face mould comprises two mould sections both for forming 24 bodies B of closure 101. Alternatively, the 48 impression single face mould could comprise two mould sections both for forming 24 bodies A of closure 101. Thus, the moulding machine may be convertible from a pick and place mould comprising two or more mould sections into a single face mould comprising a plurality of only one of the two or more mould sections.

Figure 6:
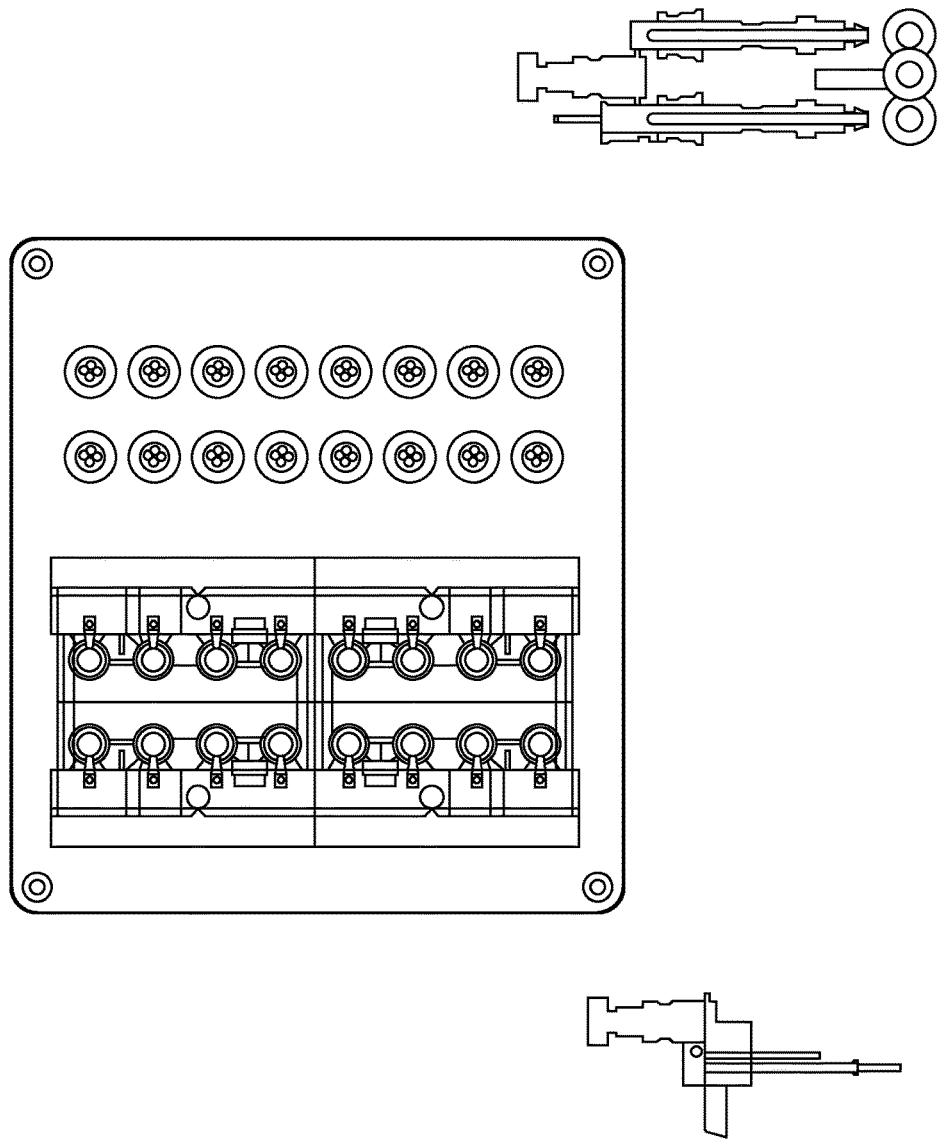
FIG. 6 is a side elevation of a mould formed according to an alternative embodiment for producing a two-piece "Disc Top" style dispensing closure.

FIG. 6 shows a mould formed according to an alternative embodiment for producing a two-piece "Disc Top" style dispensing closure.

Figure 7A:
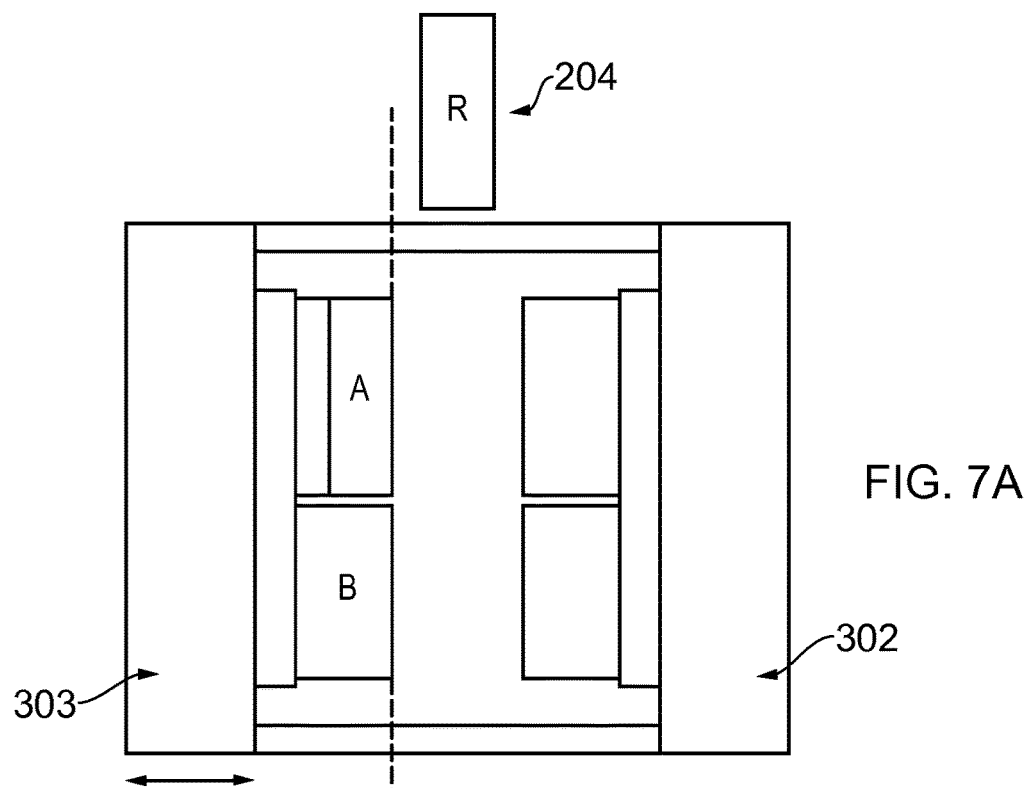
Figure 7B:
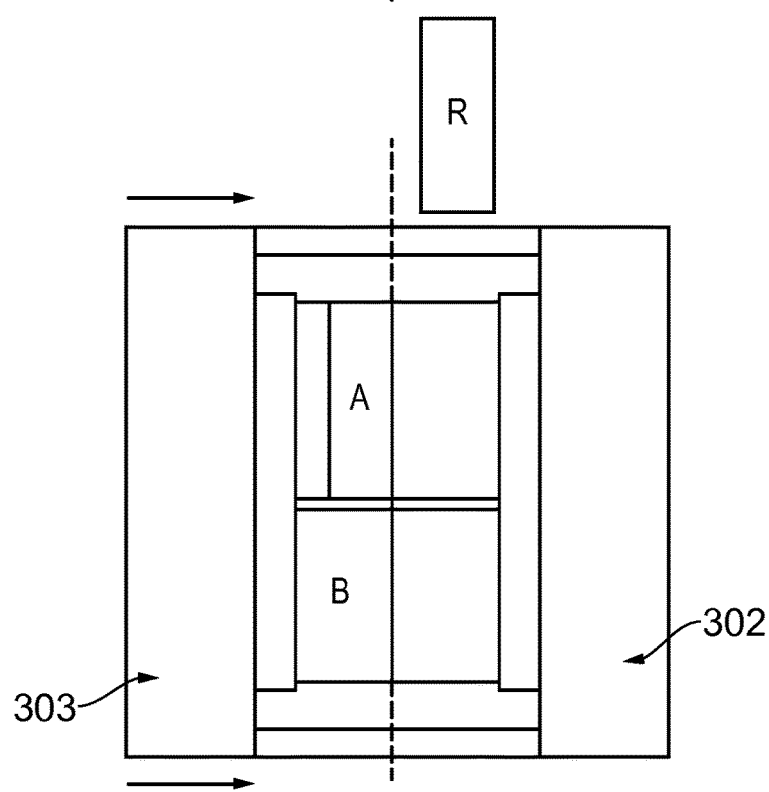
Figure 7C:
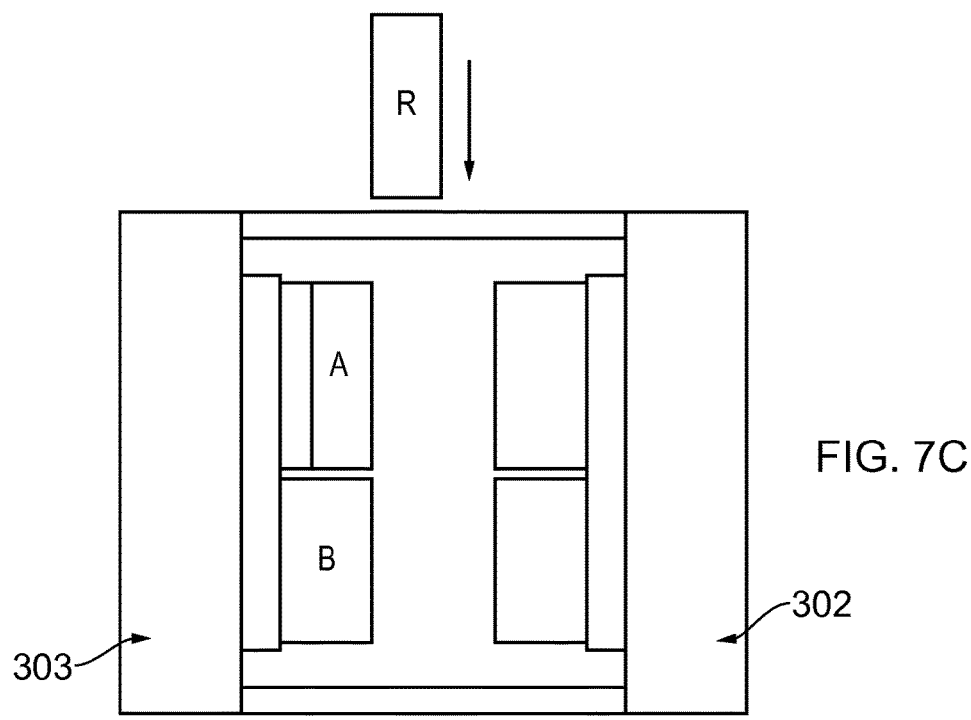
Figure 7D:
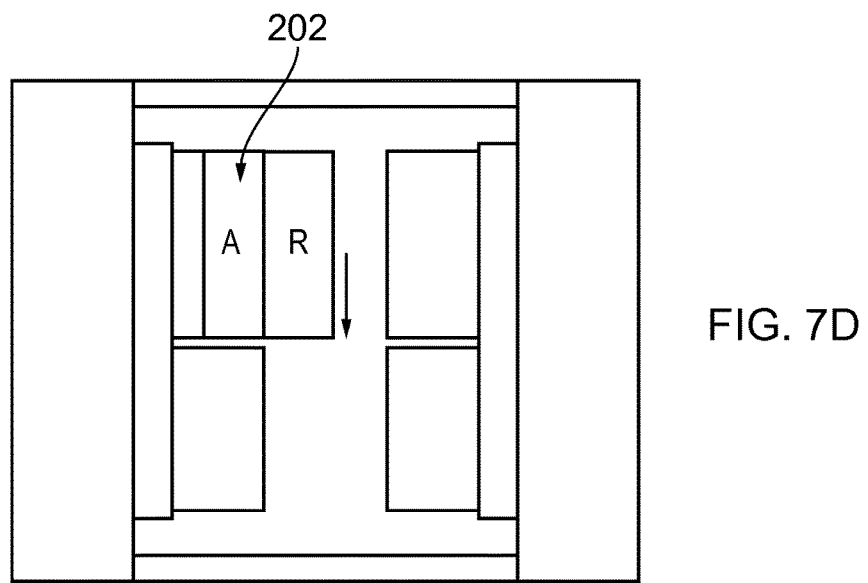

FIGS. 7A-7F show steps in a method of forming an article having two or more parts. In this illustrated example, the article is closure 101 having a lid A and a body B. The method is performed using an in-mould pick and place system. The in-mould pick and place system comprises a moulding machine having a fixed platen 302, a moving platen 303, a first mould section 202 for forming lids A, a second mould section 203 for forming bodies B and an in-mould pick and place means 204 comprising pick and place robot R. In FIG. 7A, the moving platen 302 is open and the robot R is outside from the mould sections 202, 203. In FIG. 7B, the moving platen 303 is closed, and lids A and bodies B are moulded in the respective mould section. In FIG. 7C, the moving platen 303 is opened, after the lids A and bodies B have been moulded, to allow the robot R to perform in-mould operations. In FIG. 7D, the robot R is moved into alignment with the first mould section 202 and picks up the moulded lids A. In FIG. 7E, the robot R along with the lids A moves into alignment with the second mould section 203 and the lids A are assembled with the bodies B. FIG. 7F, the robot R moves out of the mould back into the position of FIG. 7A and assembled closures 101 are discharged from the mould. In a method of forming an article having two or more parts, the in-mould pick and place means may thus perform at least one assembly operation in the assembly of a first moulded part of an article with a second moulded part of the article. In a method, of forming an article having two or more parts, the action of the ejection of a second moulded part from a second mould section by the moulding machine is used in the assembly of a first moulded part of the article with the second moulded part of the article.

In the arrangement shown in FIGS. 7A-7F, the first and second mould sections 202, 203 are oriented vertically, and the robot R of the pick and place means 204 also moves vertically.

Figure 8:
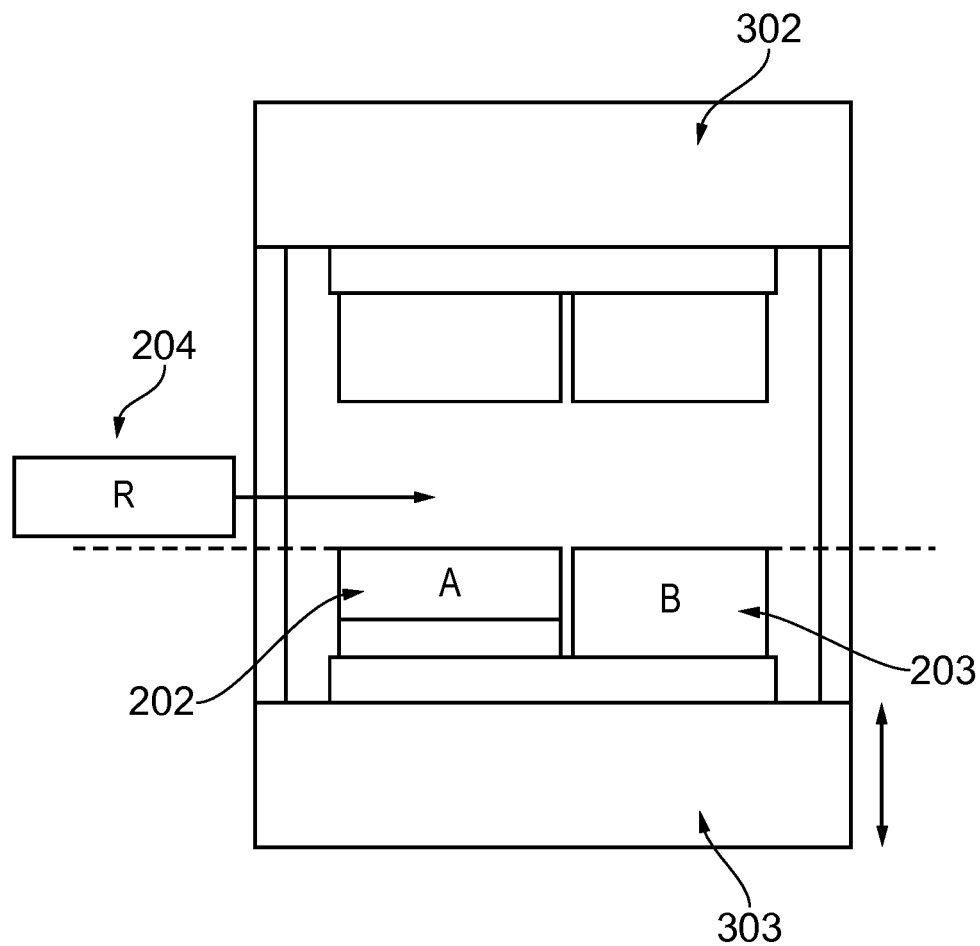
FIG. 8 shows an alternative arrangement of the in-mould pick and place system shown in FIG. 7A-7F.

In the alternative arrangement shown in FIG. 8, the first and second mould sections 202, 203 are oriented horizontally, and the robot R of the pick and place means 204 also moves horizontally. Moulds may be mounted to platens of the moulding machine by any suitable means, for example using bolts, or magnetic or hydraulic clamps.

Figure 9A:
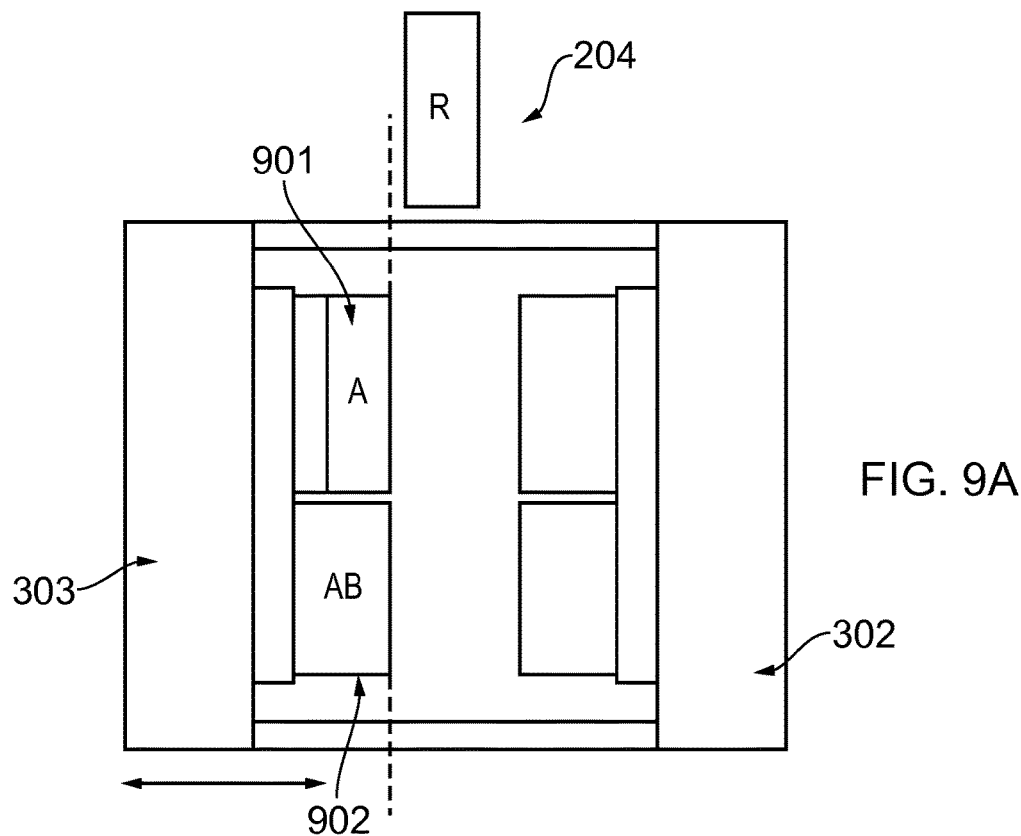
FIGS. 9A-9G show steps in an alternative method of forming an article having two or more parts.
Figure 9B:
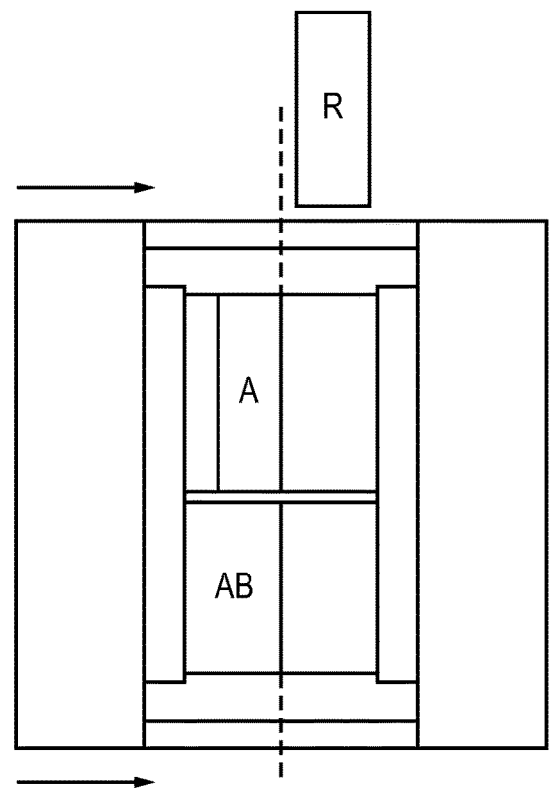
Figure 9C:
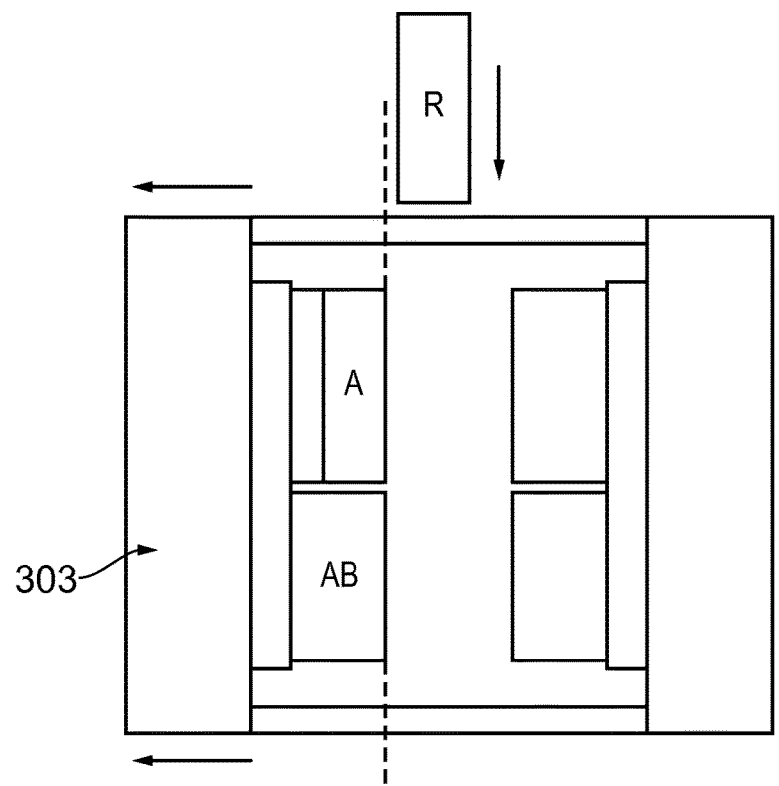
Figure 9D:
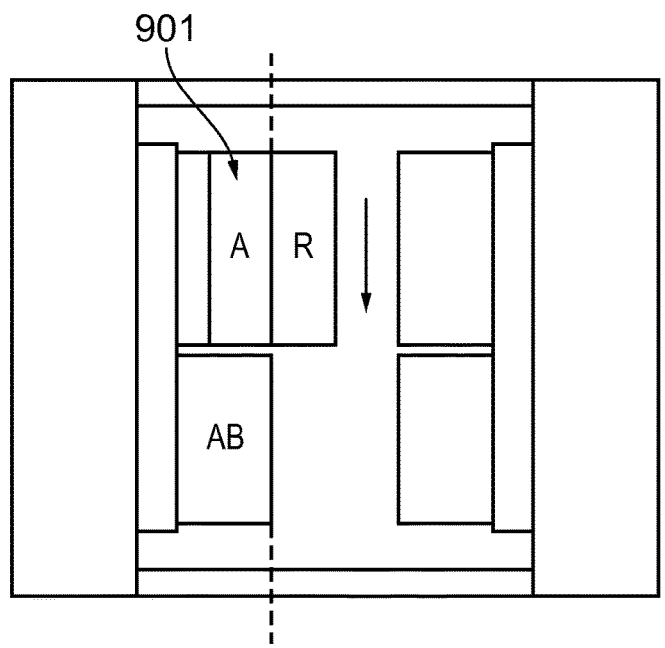
Figure 9E:
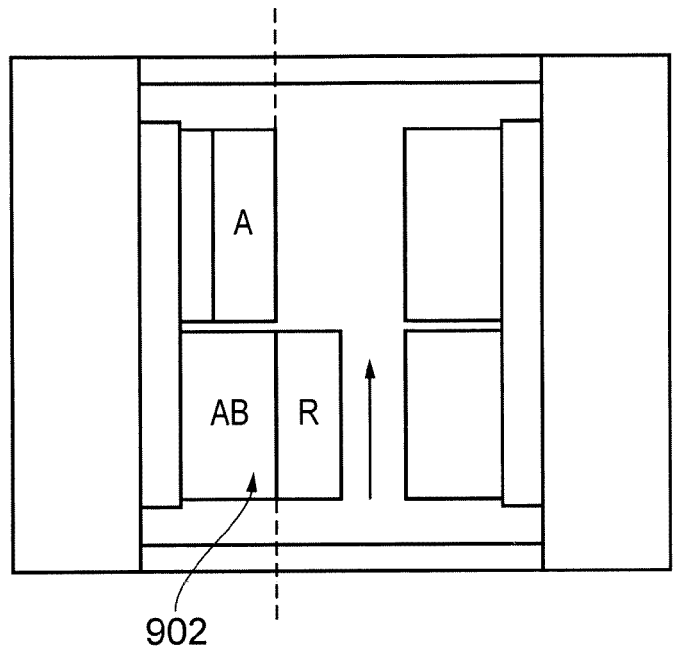
Figure 9F:
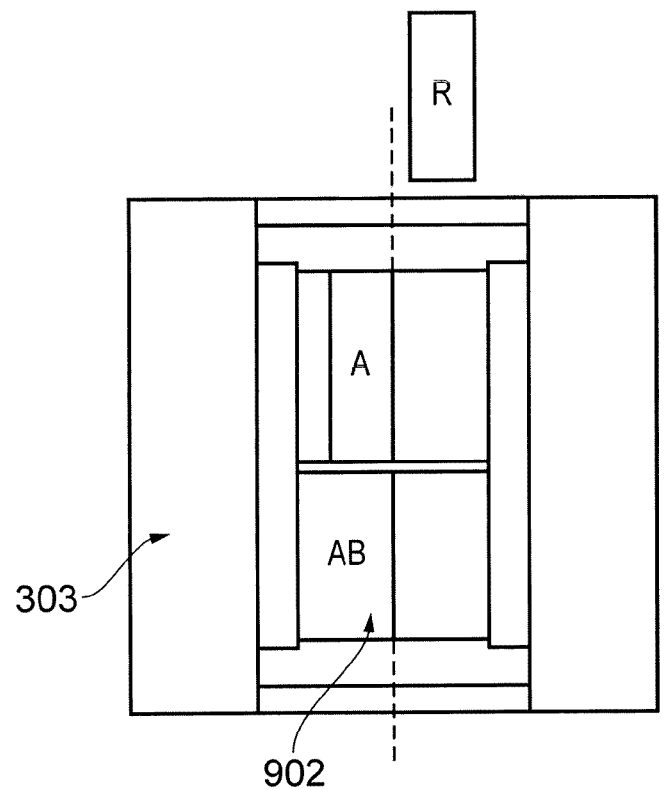
Figure 9G:
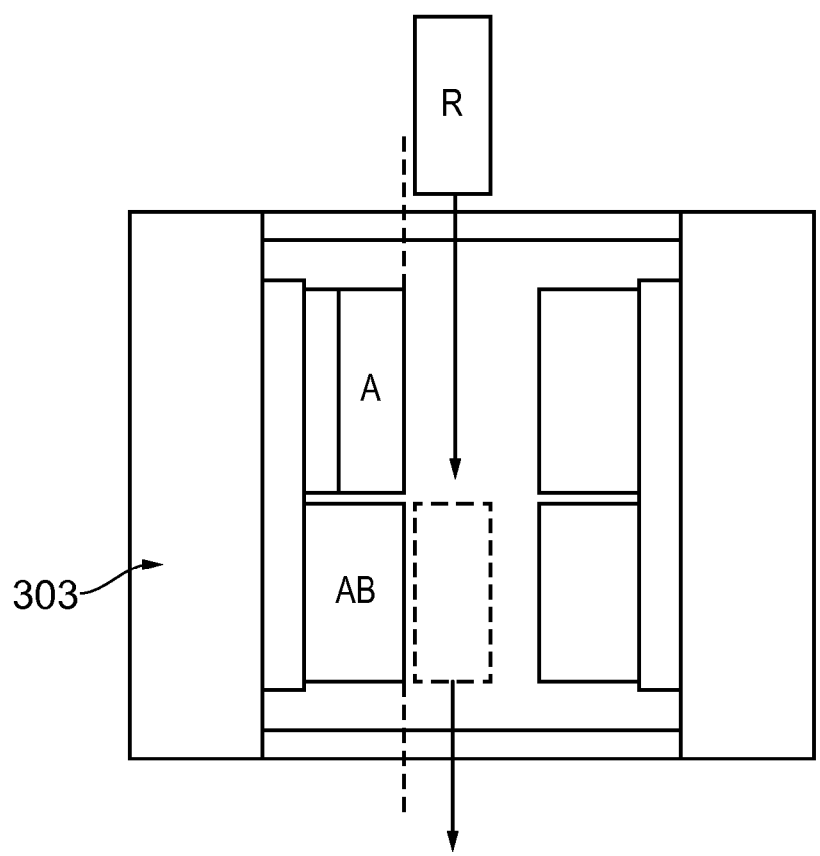

FIGS. 9A-9G show steps in an alternative method of forming an article having two or more parts. In this illustrated example, the article has a first part A that is overmoulded to form an A+B article. The method is performed using an in-mould pick and place system. The in-mould pick and place system comprises a moulding machine having a fixed platen 302, a moving platen 303, a first mould section 901 for forming part A, a second mould section 902 for forming A part B over part A and an in-mould pick and place means 204 comprising pick and place robot R. In FIG. 9A, the moving platen 302 is open and the robot R is outside from the mould sections 901, 902. In FIG. 9B, the moving platen 303 is closed, and part A is moulded in the first mould section 901. In FIG. 9C, the moving platen 303 is opened, after the part A has been moulded, to allow the robot R to perform in-mould operations. In FIG. 9D, the robot R is moved into alignment with the first mould section 901 and picks up the moulded part A. FIG. 9E, the robot R, along with the moulded part A, moves into alignment with the second mould section 902 and the moulded A is placed into the second mould section 902. In FIG. 9F, the robot R has moved out of the mould back into the position of FIG. 9A, the moving platen 303 has closed and part B is moulded over part A in the second mould section 902. In FIG. 9G, the moving platen 303 has opened, and the A+B article can be discharged robot discharged from the mould. The robot R may be used in the article discharge process.

Figure 10:
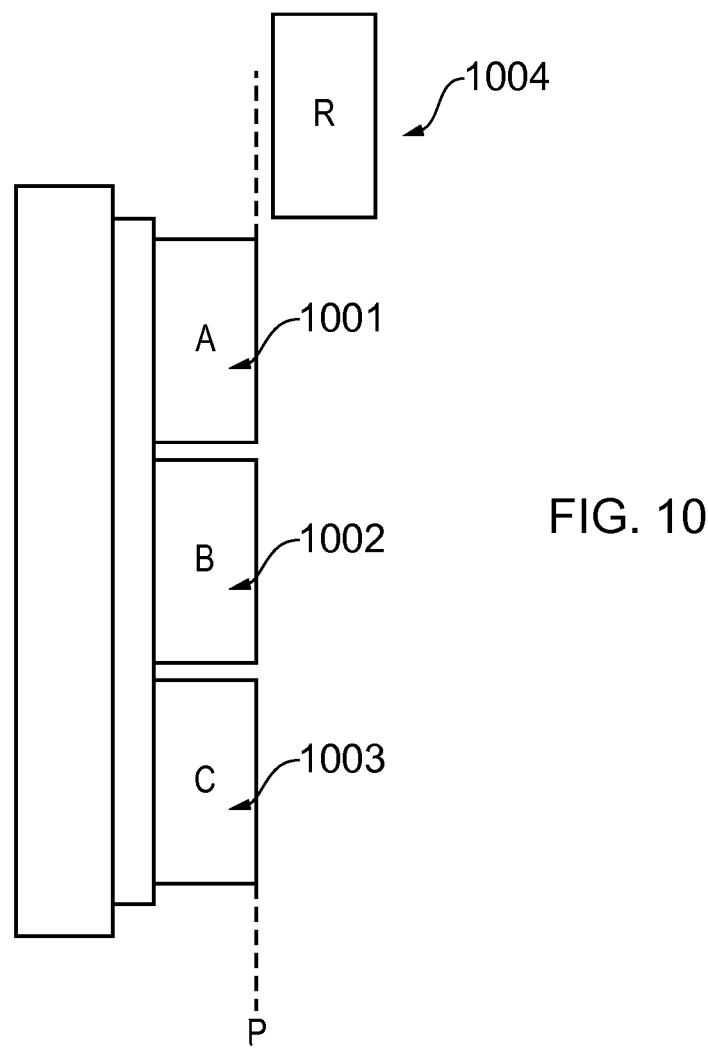
FIG. 10 illustrates an in-mould pick and place system comprising more than two mould sections.

As shown in FIG. 10, an in-mould pick and place system may comprise more than two mould sections. A moulding machine may have a first mould section 1001 for forming a part A, a second mould section 1002 for forming a part B, a third mould section for forming a part C and an in-mould pick and place means 1004 comprising a pick and place robot R.

Figure 11:
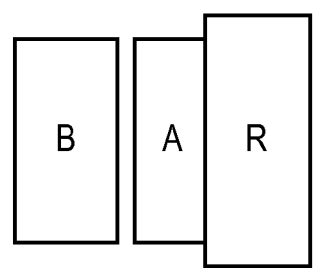
FIG. 11 illustrates assembly operations that may be performed in-mould by the pick and place means of an in-mould pick and place system.

The pick and place means of an in-mould pick and place system may perform assembly operations in-mould. As shown in FIG. 11, the pick and place means may perform a push-fit action, as indicated by arrow 1101, to snap-fit one part into engagement with another, or may perform a screw-fit operation, as indicated by arrow 1102, to twist one part into engagement with another. The pick and place means may be arranged to perform any other type of assembly operation, and may perform a combination or sequence of different types of assembly operations.

Figure 12:
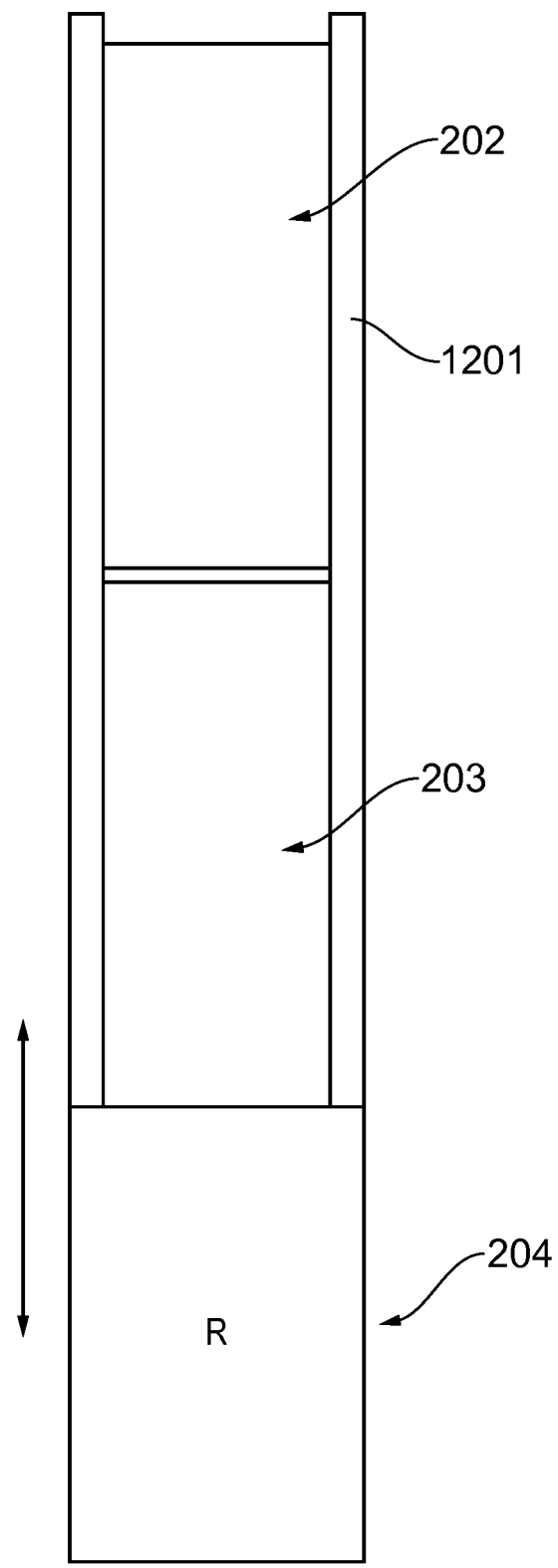
FIG. 12 illustrates an in-mould pick and place system in which a pick and place robot is secured to a mould.

FIG. 12 shows an arrangement in which a robot R of a pick and place means 204 is secured to a mould and is arranged to travel along a track system 1201 across the faces of first and second mould sections 202, 203. A moulding machine may thus comprise one or more moulds and a robot pick-and-place system, in which the robot pick-and-place system is fixed to the mould. In an alternative arrangement, the robot R is fixed to tie bars of the moulding machine.

An in-mould pick-and-place system as described herein provides for increased flexibility in moulding operations and in-mould assembly operations. Difficult or complex arrangements can be achieved more effectively, and the in-mould pick-and-place system can be simply and quickly adapted for different moulding operations.

An in-mould pick and place system as described herein may be used in a method of forming an article in which a first part of the article is moulded in a first mould section of a moulding machine comprising two or more mould sections for respective article parts and an in-mould pick and place means, the in-mould pick and place means moves a moulded first part of the article from the first mould section into a second mould section of the two or more mould sections, and the moulded first part of the article is over-moulded in the second mould section. An in-mould pick and place system as described herein may be used in a method of forming an article in which the first and second parts of the article are moulded in respective first and second mould sections of a moulding machine comprising two or more mould sections for respective article parts and an in-mould pick and place means during the same moulding operation, and the in-mould pick and place means moves a moulded first part of the article from the first mould section to the second mould section for assembly with a moulded second part of the article. A method forming an article using an in-mould pick and place system as described herein may include an inspection step, for example using a camera system.

An in-mould pick and place system as described herein may comprise an injection moulding machine that may operate with, for example a 1K ("one-shot") or 2K ("two-shot") process. The moulding machine may be any suitable type, such as hydraulic, mechanical, electric, or a hybrid type. An in-mould pick and place system as described herein may comprise a pick-and-place robot of any suitable type.

An in-mould pick and place system as described herein may comprise two combined moulds in a bi-injection press which is linked with a robot pick and place system.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A moulding machine suitable for producing an article having two or more parts, the moulding machine comprising two or more mould sections for respective article parts and an in-mould pick and place means, wherein
the moulding machine further comprises an adaptation plate suitable for use in providing a common parting line between the mould sections for respective article parts that are differently sized.

2. The moulding machine as claimed in claim 1, suitable for producing a plastics closure article having two or more assemblable parts.

3. The moulding machine as claimed in claim 1, in which the mould sections are carried on a mould frame.

4. The moulding machine as claimed in claim 1, in which the mould sections are provided on the same mould plate.

5. The moulding machine as claimed in claim 1, in which at least some of the mould sections are oriented in one of: horizontally or vertically.

6. The moulding machine as claimed in claim 1, in which the in-mould pick and place means operates at least partly from one of: above the mould sections, beneath the mould sections, or laterally of the mould sections.

7. The moulding machine as claimed in claim 1, wherein the mould sections are suitable for forming the same number of article parts.

8. The moulding machine as claimed in claim 1, wherein said in-mould pick and place means comprises a robot mounted to one of: a mould section, or tie bars of the moulding machine.

9. A method of forming an article having two or more parts using the moulding machine of claim 1, in which:
a first part of said article is moulded in a first mould section of the moulding machine, and
said in-mould pick and place means moves the moulded first part of said article from said first mould section to a second mould section of the two or more mould sections.

10. The method of forming an article having two or more parts as claimed in claim 9, in which:
first and second parts of said article are moulded in respective first and second mould sections of said moulding machine during the same moulding operation, and
said in-mould pick and place means moves the moulded first part of said article from said first mould section to the second mould section for assembly with the moulded second part of said article.

11. The method of forming an article having two or more parts as claimed in claim 10, wherein an ejection of the moulded second part of said article from said second mould section by said moulding machine is used in the assembly of said moulded first part of said article with said moulded second part of said article.

12. The method of forming an article having two or more parts as claimed in claim 10, in which said in-mould pick and place means performs at least one assembly operation in the assembly of said moulded first part of said article with said moulded second part of said article.

13. The method of forming an article having two or more parts as claimed in claim 12, in which said at least one assembly operation performed by said in-mould pick and place means comprises: a screw-fit action which twists one part into engagement with another part, and a push-fit action which snap-fits one part into engagement with another part.

14. The method of forming an article having two or more parts as claimed in claim 9, in which:
the first part of said article is moulded in the first mould section of said moulding machine,
said in-mould pick and place means moves the moulded first part of said article from said first mould section into the second mould section of the two or more mould sections, and
said moulded first part of said article is over-moulded in said second mould section.

15. The moulding machine as claimed in claim 8, wherein said robot is secured to a mould and is arranged to travel along a track system across faces of two or more mould sections.

* * * * *